(12) United States Patent
Binek et al.

(10) Patent No.: US 12,523,156 B2
(45) Date of Patent: Jan. 13, 2026

(54) TURBINE ENGINE STRUCTURE WITH AN INTEGRAL FLUID RESERVOIR

(71) Applicant: RTX Corporation, Farmington, CT (US)

(72) Inventors: Lawrence A. Binek, Glastonbury, CT (US); Jose R. Paulino, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/201,014

(22) Filed: May 23, 2023

(65) Prior Publication Data

US 2024/0392691 A1 Nov. 28, 2024

(51) Int. Cl.
| | |
|---|---|
| *F01D 9/04* | (2006.01) |
| *F01D 25/18* | (2006.01) |
| *F01D 25/26* | (2006.01) |
| *F02C 7/06* | (2006.01) |
| *F02C 7/22* | (2006.01) |
| *F16C 33/66* | (2006.01) |

(52) U.S. Cl.
CPC ............. *F01D 9/041* (2013.01); *F01D 25/18* (2013.01); *F01D 25/26* (2013.01); *F02C 7/06* (2013.01); *F02C 7/22* (2013.01); *F05D 2240/50* (2013.01); *F05D 2260/98* (2013.01); *F16C 33/6659* (2013.01); *F16C 2360/23* (2013.01)

(58) Field of Classification Search
CPC .......... F01D 9/041; F01D 25/18; F01D 25/26; F02C 7/06; F02C 7/22; F05D 2240/50; F05D 2260/98; F16C 33/6659; F16C 2360/23
See application file for complete search history.

(56) References Cited

U.S. PATENT DOCUMENTS

| | | | | |
|---|---|---|---|---|
| 3,107,489 A | * | 10/1963 | Palfreyman | F02C 7/32 60/39.093 |
| 3,902,314 A | | 9/1975 | Straniti | |
| 3,932,988 A | * | 1/1976 | Beaufrere | F02C 7/12 60/737 |
| 4,183,207 A | | 1/1980 | Libertini | |
| 5,526,640 A | * | 6/1996 | Brooks | F01D 25/16 60/804 |

(Continued)

OTHER PUBLICATIONS

EP Search Report for EP Patent Application No. 24177572.5 dated Nov. 13, 2024.

*Primary Examiner* — Brian Christopher Delrue
(74) *Attorney, Agent, or Firm* — Getz Balich LLC

(57) ABSTRACT

An apparatus for a turbine engine includes a monolithic engine structure. The monolithic body structure includes an inner case, an outer case, a plurality of vanes, a flowpath, a reservoir cavity and a plurality of feed passages. The inner case extends axially along and circumferentially around an axis. The inner case forms an inner boundary of the flowpath in the monolithic engine structure. The outer case extends axially along and circumferentially around the inner case. The outer case forms an outer boundary of the flowpath in the monolithic engine structure. The vanes are arranged circumferentially around the axis. Each of the vanes extends radially across the flowpath from the inner case to the outer case. The vanes include a first vane. The reservoir cavity is embedded within the outer case. The feed passages are fluidly coupled with the reservoir cavity and extend through the first vane.

19 Claims, 6 Drawing Sheets

(56) References Cited

U.S. PATENT DOCUMENTS

| | | | | |
|---|---|---|---|---|
| 6,161,768 | A * | 12/2000 | Gordon | F02C 3/14 237/13 |
| 6,925,812 | B2 * | 8/2005 | Condevaux | F02C 7/22 431/168 |
| 7,562,519 | B1 * | 7/2009 | Harris | F02C 7/06 60/39.08 |
| 7,748,209 | B1 * | 7/2010 | Schopf | F02C 7/06 60/39.08 |
| 7,937,946 | B1 * | 5/2011 | Harris | F02C 7/224 60/39.08 |
| 8,438,858 | B1 * | 5/2013 | Jones | F01D 11/003 60/804 |
| 10,570,761 | B2 | 2/2020 | Green | |
| 10,641,128 | B2 * | 5/2020 | Snape | F02C 7/14 |
| 11,021,963 | B2 | 6/2021 | Binek | |
| 11,181,007 | B1 * | 11/2021 | Ress, Jr. | F01D 25/125 |
| 11,377,977 | B2 * | 7/2022 | Binek | F02C 7/06 |
| 2002/0095939 | A1 * | 7/2002 | Gordon | F02C 3/14 60/734 |
| 2005/0039463 | A1 * | 2/2005 | Condevaux | F02C 7/22 60/776 |
| 2011/0041509 | A1 * | 2/2011 | Thompson, Jr. | F02C 7/224 60/772 |
| 2013/0177420 | A1 | 7/2013 | Winn | |
| 2014/0193274 | A1 * | 7/2014 | Thompson, Jr. | F01D 5/185 416/97 R |
| 2015/0308344 | A1 * | 10/2015 | Vo | F02C 7/06 415/213.1 |
| 2017/0298830 | A1 * | 10/2017 | Ertas | F01D 25/22 |
| 2017/0314471 | A1 | 11/2017 | Sennoun | |
| 2020/0347728 | A1 | 11/2020 | Binek | |
| 2021/0087955 | A1 * | 3/2021 | Binek | B33Y 10/00 |
| 2022/0049904 | A1 * | 2/2022 | Martinez | F02C 7/14 |
| 2022/0316408 | A1 | 10/2022 | Binek | |
| 2023/0026977 | A1 | 1/2023 | Read | |
| 2023/0068146 | A1 | 3/2023 | Maesato | |

* cited by examiner

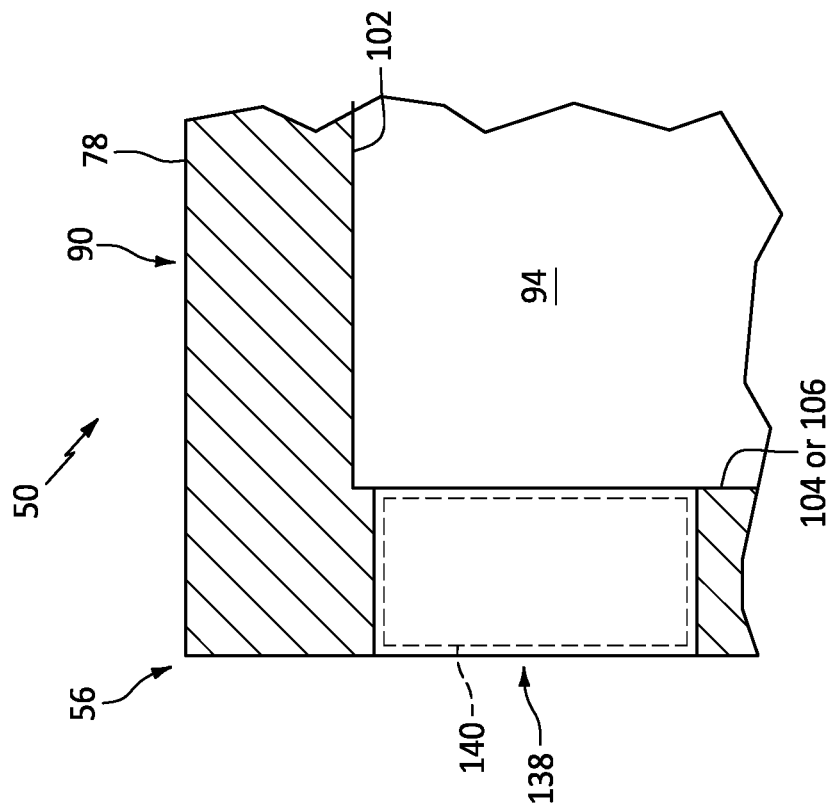
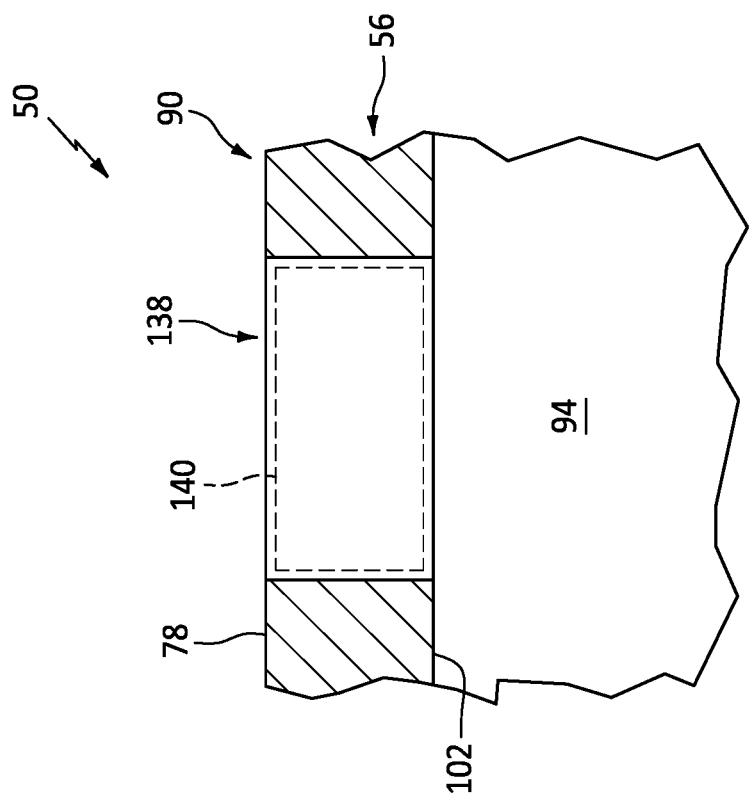

TURBINE ENGINE STRUCTURE WITH AN INTEGRAL FLUID RESERVOIR

BACKGROUND OF THE DISCLOSURE

1. Technical Field

This disclosure relates generally to a turbine engine and, more particularly, to a fluid system for the turbine engine.

2. Background Information

A gas turbine engine includes various fluid systems such as a lubrication system. The lubrication system may route lubricant across a flowpath to supply the lubricant to shaft bearings. Various types and configurations of such fluid systems are known in the art. While these known fluid systems have various advantages, there is still room in the art for improvement.

SUMMARY OF THE DISCLOSURE

According to an aspect of the present disclosure, an apparatus is provided for a turbine engine. This apparatus includes a monolithic engine structure. The monolithic body structure includes an inner case, an outer case, a plurality of vanes, a flowpath, a reservoir cavity and a plurality of feed passages. The inner case extends axially along and circumferentially around an axis. The inner case forms an inner boundary of the flowpath in the monolithic engine structure. The outer case extends axially along and circumferentially around the inner case. The outer case forms an outer boundary of the flowpath in the monolithic engine structure. The vanes are arranged circumferentially around the axis. Each of the vanes extends radially across the flowpath from the inner case to the outer case. The vanes include a first vane. The reservoir cavity is embedded within the outer case. The feed passages are fluidly coupled with the reservoir cavity and extend through the first vane.

According to another aspect of the present disclosure, another apparatus is provided for a turbine engine. This apparatus includes an engine structure. The engine structure includes an inner case, an outer case, a plurality of vanes, a flowpath, a reservoir cavity and a first feed passage. The inner case extends axially along and circumferentially around an axis. The inner case forms an inner boundary of the flowpath in the engine structure. The outer case extends axially along and circumferentially around the inner case. The outer case forms an outer boundary of the flowpath in the engine structure. The vanes are arranged circumferentially around the axis. Each of the vanes extends radially across the flowpath from the inner case to the outer case. The vanes include a first vane. The reservoir cavity extends radially within the outer case between an inner cavity side and an outer cavity side. The inner cavity side has a concave sectional geometry. The first feed passage extends, within the engine structure and through the first vane, between an inlet into the first feed passage and an outlet from the first feed passage. The inlet into the first feed passage is disposed in the inner cavity side at an apex of the concave sectional geometry.

According to still another aspect of the present disclosure, another apparatus is provided for a turbine engine. This apparatus includes an engine structure. The engine structure includes an inner case, an outer case, a plurality of vanes, a flowpath, a reservoir cavity, a first feed passage and a second feed passage. The inner case extends axially along and circumferentially around an axis. The inner case forms an inner boundary of the flowpath in the engine structure. The outer case extends axially along and circumferentially around the inner case. The outer case forms an outer boundary of the flowpath in the engine structure. The vanes are arranged circumferentially around the axis. Each of the vanes extends radially across the flowpath from the inner case to the outer case. The vanes include a first vane. The reservoir cavity is embedded within the outer case. The first feed passage is fluidly coupled with the reservoir cavity and extends through the first vane into the inner case. A first segment of the first feed passage angularly offset from a second segment of the first feed passage by a first included angle. The second feed passage is fluidly coupled with the reservoir cavity and extends through the first vane into the inner case. A first segment of the second feed passage is angularly offset from a second segment of the second feed passage by a second included angle that is different than the first included angle.

The engine structure may be configured as a monolithic inlet structure adapted to direct air into the turbine engine.

The engine structure may be configured as a monolithic body.

The outlet from the first feed passage may be disposed at an inner bore of the inner case.

The reservoir cavity may extend radially within the outer case between an inner cavity side and an outer cavity side. A radius from the axis to the inner cavity side may increase as the reservoir cavity extends axially in a first direction along the axis within the outer case from a low region of the inner cavity side to a first end of the reservoir cavity. An inlet into a first of the feed passages may be disposed in the low region of the inner cavity side.

The radius may also increase as the reservoir cavity extends axially in a second direction along the axis within the outer case from the low region of the inner cavity side to a second end of the reservoir cavity.

The reservoir cavity may extend radially within the outer case between an inner cavity side and an outer cavity side. The inner cavity side may have a concave sectional geometry. An inlet into a first of the feed passages may be disposed in the inner cavity side at an apex of the concave sectional geometry.

The monolithic engine structure may also include a port projecting radially into the outer case to the reservoir cavity.

The monolithic engine structure may also include a port extending laterally in the outer case to the reservoir cavity.

Each of the feed passages may extend from the reservoir cavity, radially through the first vane, to a respective outlet at an inner bore of the inner case.

The feed passages may include a first feed passage. The first feed passage may extend within the monolithic engine structure along a centerline from an inlet into the first feed passage to an outlet from the first feed passage. The centerline may be curved along an intermediate segment of the first feed passage.

The feed passages may include a first feed passage. A first segment of the first feed passage may be angularly offset from a second segment of the first feed passage by a first included angle.

The feed passages may include a second feed passage. A first segment of the second feed passage may be angularly offset from a second segment of the second feed passage by a second included angle that is different than the first included angle.

The feed passages may include a first feed passage and a second feed passage. The first feed passage may have a first centerline. The second feed passage may have a second centerline. The first centerline and the second centerline may lie in a common plane.

The feed passages may include a first feed passage. A segment of the first feed passage may extend circumferentially within the inner case about the axis.

The apparatus may also include a first engine component housed within an inner bore of the monolithic engine structure. The feed passages may include a first feed passage. The first feed passage may be configured to direct a fluid contained within the reservoir cavity to the first engine component.

The feed passages may also include a second feed passage. The second feed passage may be configured to further direct the fluid contained within the reservoir cavity to the first engine component.

The apparatus may also include a second engine component housed within the inner bore of the monolithic engine structure. The feed passages may also include a second feed passage. The second feed passage may be configured to direct the fluid contained within the reservoir cavity to the second engine component.

The vanes may also include a second vane. The feed passages may be first-vane feed passages. The monolithic engine structure may also include a plurality of second-vane feed passages. The second-vane feed passages may be fluidly coupled with the reservoir cavity and extend through the second vane.

The monolithic engine structure may be configured as an inlet structure adapted to direct air into the turbine engine.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 6A and 6B are partial sectional illustrations of a fluid reservoir with various fill/drain ports.

DETAILED DESCRIPTION

Figure 1:
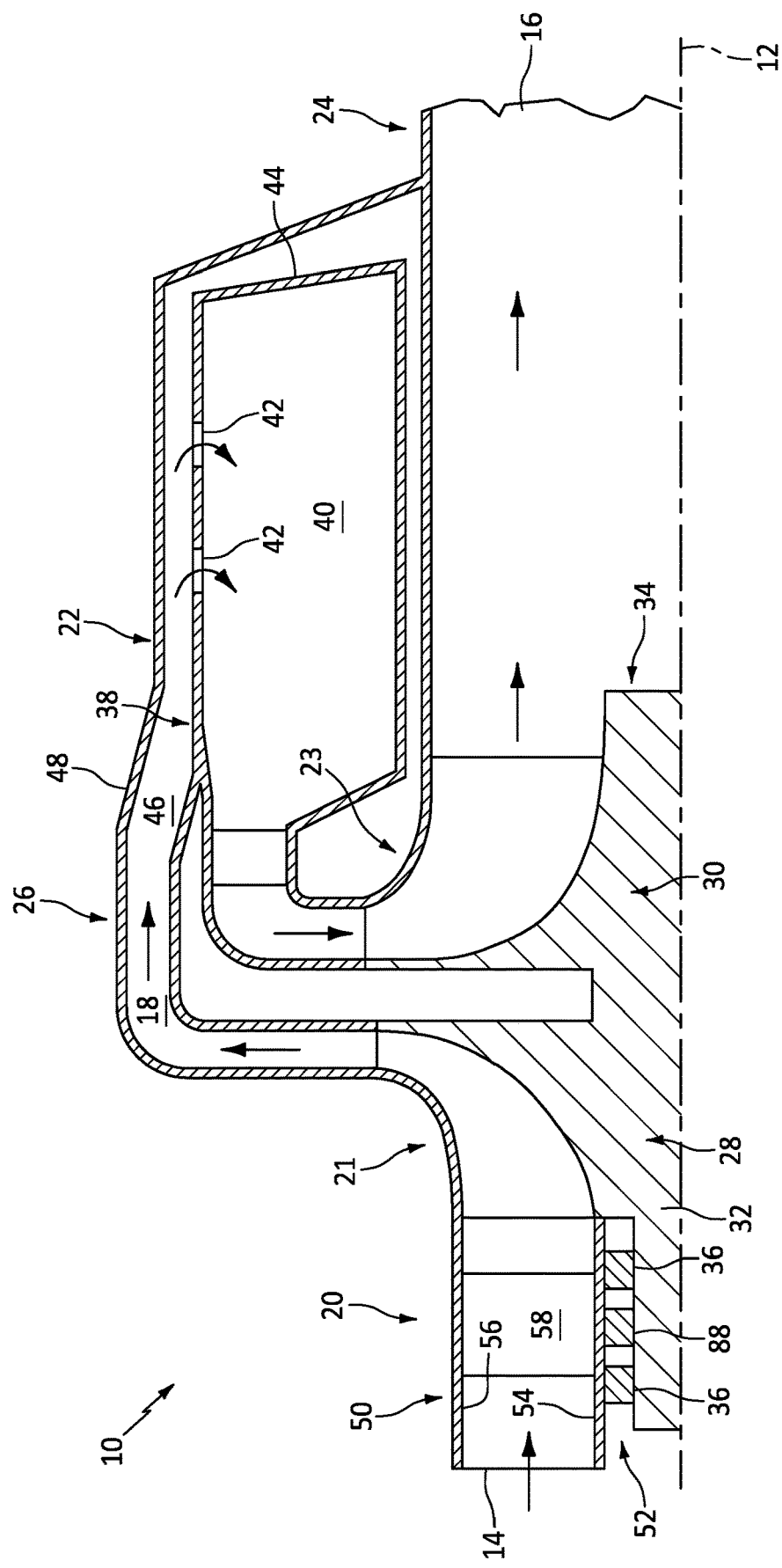
FIG. 1 is a partial side sectional illustration of a gas turbine engine.

FIG. 1 is a partial side sectional illustration of a gas turbine engine 10. This turbine engine 10 is configured as a single spool, radial-flow gas turbine engine. The turbine engine 10 may be configured as or included as part of a propulsion system for an aircraft. The turbine engine 10 may also or alternatively be configured as or included as part of a power generation system for the aircraft; e.g., an auxiliary power unit (APU). Examples of the aircraft include, but are not limited to, an airplane, a drone (e.g., an unmanned aerial vehicle (UAV)), a helicopter or any other manned or unmanned aerial vehicle. The present disclosure, however, is not limited to such an exemplary single spool, radial-flow gas turbine engine nor to aircraft applications.

The turbine engine 10 of FIG. 1 extends axially along an axis 12 from a forward, upstream airflow inlet 14 into the turbine engine 10 to an aft, downstream combustion products exhaust 16 from the turbine engine 10. The axis 12 may be an axial centerline of the turbine engine 10. The axis 12 may also or alternatively be an axial centerline and/or a rotational axis for various components (e.g., rotors) within the turbine engine 10.

The turbine engine 10 includes a core flowpath 18, an inlet section 20, a compressor section 21, a combustor section 22, a turbine section 23 and an exhaust section 24. The turbine engine 10 also includes a stationary structure 26 housing and/or at least partially forming one or more or all of the engine sections 20-24.

The core flowpath 18 extends within the turbine engine 10 from the airflow inlet 14 to the combustion products exhaust 16. The core flowpath 18 of FIG. 1, in particular, extends sequentially through the inlet section 20, the compressor section 21, the combustor section 22, the turbine section 23 and the exhaust section 24.

The compressor section 21 includes a bladed compressor rotor 28; e.g., a compressor impeller. The turbine section 23 includes a bladed turbine rotor 30; e.g., a turbine impeller. Each of these engine rotors 28, 30 includes a plurality of rotor blades (e.g., vanes) arranged circumferentially around and connected to at least one respective rotor hub. The rotor blades, for example, may be formed integral with or mechanically fastened, welded, brazed and/or otherwise attached to the respective rotor hub.

The compressor rotor 28 may be configured as a radial flow compressor rotor, and the compressor section 21 may be configured as a radial flow compressor section. The turbine rotor 30 may be configured as a radial flow turbine rotor, and the turbine section 23 may be configured as a radial flow turbine section. The compressor rotor 28 of FIG. 1 is connected to the turbine rotor 30 and an engine shaft 32. At least (or only) the compressor rotor 28, the turbine rotor 30 and the engine shaft 32 may form an engine rotating structure 34 within the turbine engine 10. This engine rotating structure 34 and its engine shaft 32 are rotatably supported by the stationary structure 26 through a plurality of bearings 36; e.g., rolling element bearings, journal bearings, etc.

The combustor section 22 may include an annular combustor 38 with an annular combustion chamber 40. The combustor 38 of FIG. 1 is configured as a reverse flow combustor. Inlets ports 42/flow tubes into the combustion chamber 40, for example, may be arranged at (e.g., on, adjacent or proximate) and/or towards an aft bulkhead wall 44 of the combustor 38. An outlet from the combustor 38 may be arranged axially aft of an inlet to the turbine section 23. The combustor 38 may also be arranged radially outboard of and/or axially overlap at least a (e.g., aft) portion of the turbine section 23. With this arrangement, the core flowpath 18 of FIG. 1 reverses direction (e.g., from a forward-to-aft direction to an aft-to-forward direction) a first time as the core flowpath 18 extends from a diffuser plenum 46 surrounding the combustor 38 into the combustion chamber 40. The core flowpath 18 of FIG. 1 then reverses direction (e.g., from the aft-to-forward direction to the forward-to-aft direction) a second time as the core flowpath 18 extends from the combustion chamber 40 into the turbine section 23.

During engine operation, air enters the turbine engine 10 through the inlet section 20 and its airflow inlet 14. The inlet section 20 directs the incoming air from the airflow inlet 14 into the core flowpath 18 and the compressor section 21. The air entering the core flowpath 18 may be referred to as core air. This core air is compressed by the compressor rotor 28. The compressed core air is directed through a diffuser 48 and its diffuser plenum 46 into the combustion chamber 40. Fuel is injected and mixed with the compressed core air to provide a fuel-air mixture. This fuel-air mixture is ignited within the combustion chamber 40, and combustion products thereof flow through the turbine section 23 and cause the turbine rotor 30 to rotate. The rotation of the turbine rotor 30 drives rotation of the compressor rotor 28 and, thus, compression of the air received from the airflow inlet 14. The exhaust section 24 receives the combustion products from the turbine section 23. The exhaust section 24 directs these combustion products out of the turbine engine 10 (e.g., into an environment external to the aircraft) through the combustion products exhaust 16.

Figure 2:
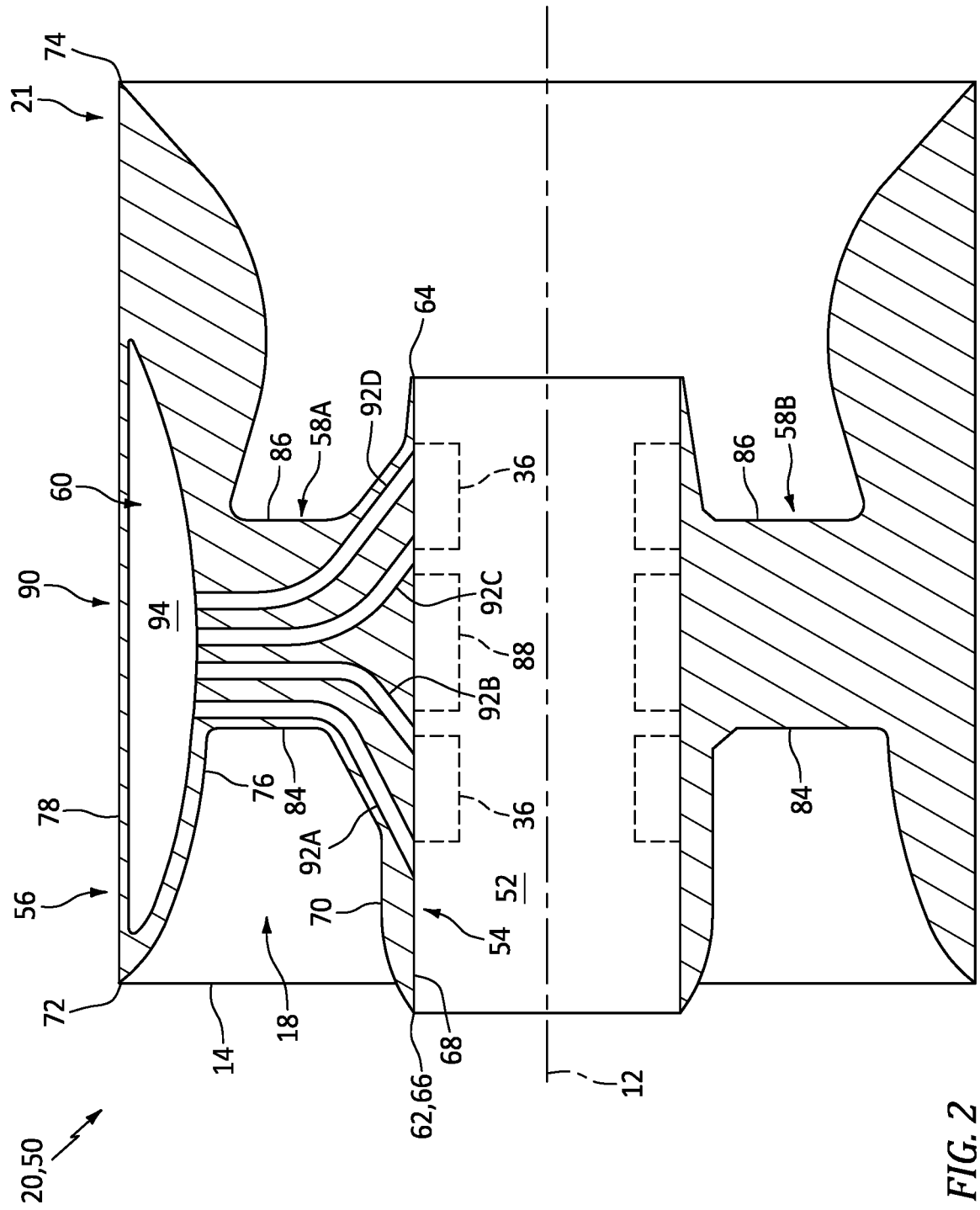
FIG. 2 is a side sectional illustration of an inlet structure.

The stationary structure 26 of FIG. 1 includes an inlet structure 50. This inlet structure 50 is configured to form the inlet section 20 and its airflow inlet 14 into the core flowpath 18. The inlet structure 50 of FIG. 1 is also configured to support one or more of the bearings 36 for the engine rotating structure 34 and its engine shaft 32. The bearings 36 of FIG. 1, for example, are mounted to the inlet structure 50 and housed within an inner bore 52 of the inlet structure 50. Referring to FIG. 2, the inlet structure 50 includes an inner case 54, an outer case 56 and a plurality of stationary vanes 58A and 58B (generally referring to as "58"). This inlet structure 50 also includes a fluid system 60.

Figure 3:
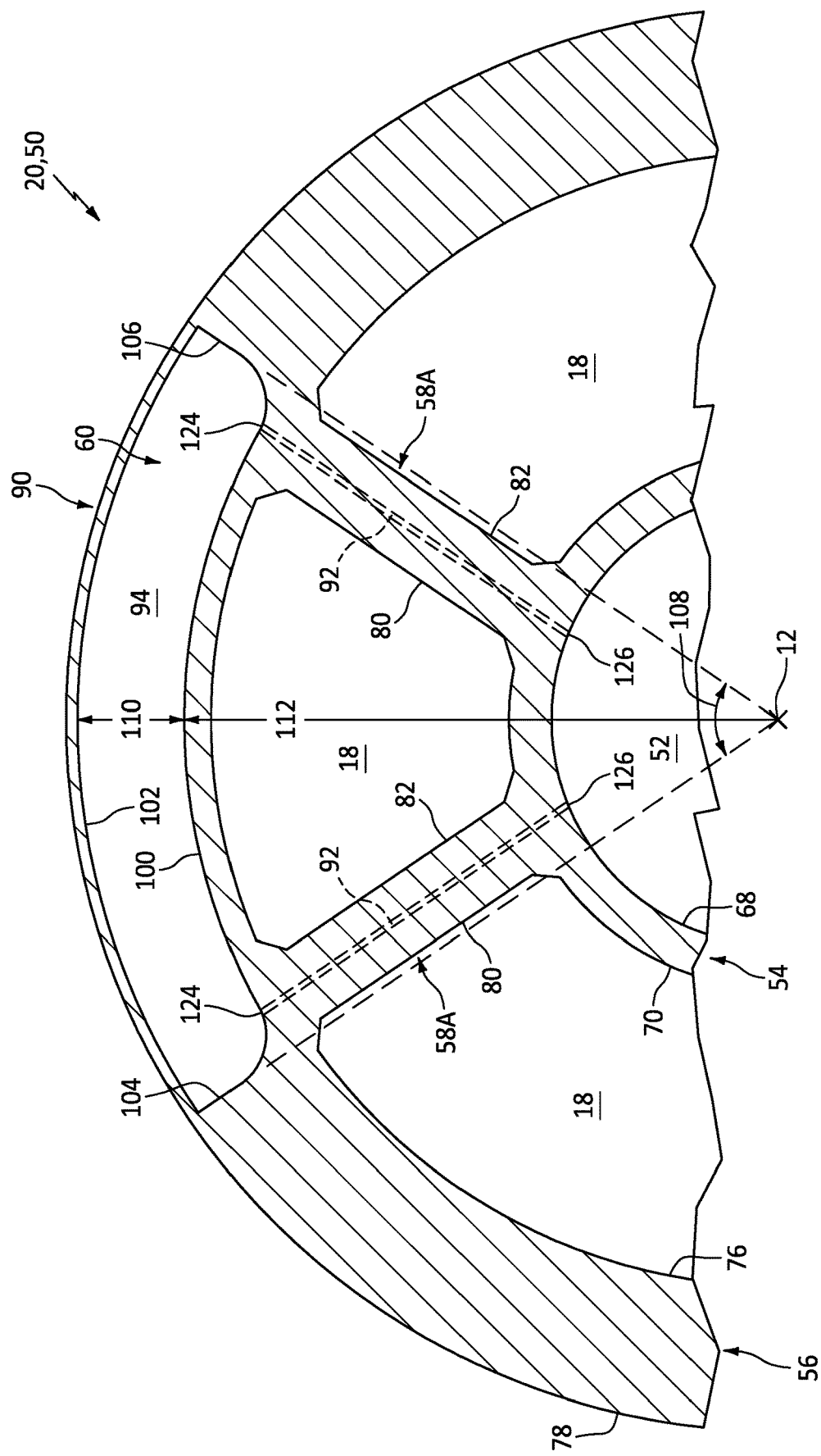
FIG. 3 is a partial cross-sectional illustration of the inlet structure.

The inner case 54 extends axially along the axis 12 from a forward, upstream end 62 of the inner case 54 to an aft, downstream end 64 of the inner case 54. The inner case upstream end 62 may be disposed at a forward, upstream end 66 of the turbine engine 10 and its inlet structure 50. The inner case 54 extends radially (in a radial outward direction away from the axis 12) from a radial inner side 68 of the inner case 54 to a radial outer side 70 of the inner case 54. The inner case inner side 68 forms a peripheral outer boundary of the inner bore 52 through the inlet structure 50 and its inner case 54. The inner case outer side 70 forms a peripheral inner boundary of at least a section of the core flowpath 18 which extends longitudinally into the turbine engine 10 and its inlet structure 50 from the airflow inlet 14. Referring to FIG. 3, the inner case 54 extends circumferentially about (e.g., completely around) the axis 12. The inner case 54 may thereby be configured with a full-hoop (e.g., tubular) geometry which circumscribes and forms the inner bore 52 within the inlet structure 50.

Referring to FIG. 2, the outer case 56 extends axially along the axis 12 from a forward, upstream end 72 of the outer case 56 to an aft, downstream end 74 of the outer case 56. The outer case upstream end 72 may be disposed at the upstream end 66 of the turbine engine 10 and its inlet structure 50. The outer case 56 extends radially (in the radial outward direction) from a radial inner side 76 of the outer case 56 to a radial outer side 78 of the outer case 56. The outer case inner side 76 forms a peripheral outer boundary of at least a section of the core flowpath 18 which extends longitudinally into the turbine engine 10 and its inlet structure 50 from the airflow inlet 14. The outer case inner side 76 of FIG. 2 also forms a peripheral outer boundary of a section of the core flowpath 18 which extends longitudinally into the compressor section 21. The outer case outer side 78 may form an exterior peripheral boundary of the turbine engine 10 along the inlet section 20 and a forward section of the compressor section 21. Referring to FIG. 3, the outer case 56 is disposed radially outboard of the inner case 54 and extends circumferentially about (e.g., completely around) the axis 12. The outer case 56 may thereby be configured with a full-hoop (e.g., tubular) geometry which circumscribes the inner case 54 as well as the vanes 58.

The vanes 58 of FIG. 3 are configured as inlet guide vanes. The vanes 58 are arranged circumferentially about the axis 12 and the inner case 54 in an array; e.g., a circular array. Each of the vanes 58 extends radially across the core flowpath 18 from the inner case 54 to the outer case 56. Each of the vanes 58 is further connected to (e.g., formed integral with) the inner case 54 and the outer case 56. Each of the vanes 58 extends laterally (e.g., circumferentially or tangentially) between and to opposing lateral sides 80 and 82 of the respective vane 58. Referring to FIG. 2, each of the vanes 58 extends longitudinally (e.g., along a chord of the respective vane 58) from a leading edge 84 of the respective vane 58 to a trailing edge 86 of the respective vane 58.

Figure 4:
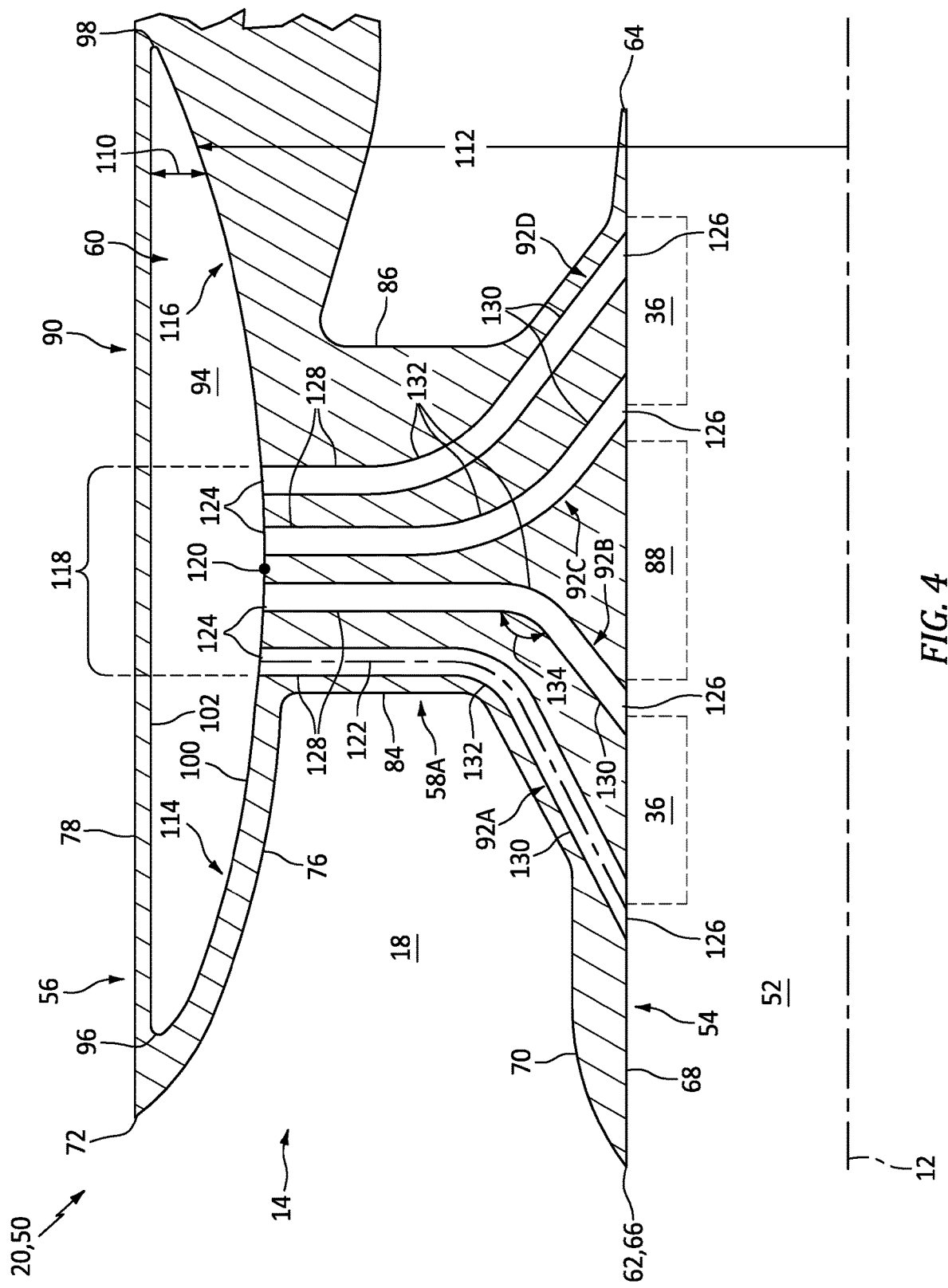
FIG. 4 is a partial side sectional illustration of the inlet structure.

Referring to FIG. 4, the fluid system 60 may be configured as a lubrication and/or cooling system for one or more components of the turbine engine 10. These engine components may include one or more of the bearings 36. The components may also or alternatively include an electric machine 88 such as an (e.g., permanent magnet) electric generator. Briefly, the electric machine 88 of FIG. 4 is mounted to the inlet structure 50 and housed within the inner bore 52 of the inlet structure 50. The fluid system 60 of FIG. 4 includes a fluid reservoir 90 (e.g., a lubricant reservoir) and one or more fluid feed passages 92A-D (generally referred to as "92") (e.g., lubricant feed passages).

The fluid reservoir 90 of FIG. 4 is integrated into the inlet structure 50 and its outer case 56. The fluid reservoir 90 of FIG. 4, for example, includes an internal reservoir cavity 94 embedded within material of the inlet structure 50 and its outer case 56. This reservoir cavity 94 extends axially along the axis 12 within a sidewall of the outer case 56 between and to a forward end 96 of the reservoir cavity 94 and an aft end 98 of the reservoir cavity 94. The reservoir cavity 94 extends radially within the outer case 56 and its sidewall (in the radial outward direction) from a radial inner side 100 of the reservoir cavity 94 to a radial outer side 102 of the reservoir cavity 94. Referring to FIG. 3, the reservoir cavity 94 extends circumferentially about the axis 12 within the outer case 56 and its sidewall between and to opposing circumferential sides 104 and 106 of the reservoir cavity 94. These cavity sides 104 and 106 are angularly spaced apart circumferentially about the axis 12 by an included angle 108. The angle 108 of FIG. 3 is between forty-five degrees (45°) and seventy-five degrees (75°); e.g., about sixty degrees (60°). In other embodiments, however, the angle 108 may be less than forty-five degrees (45°) or greater the seventy-five degrees (75°) depending on, for example, aircraft/turbine engine operation requirements.

The reservoir cavity 94 has a radial height 110 measured radially between the cavity inner side 100 and the cavity outer side 102. This cavity height 110 may be substantially uniform (e.g., the same, constant) as the reservoir cavity 94 extends circumferentially about the axis 12. A radius 112 from the axis 12 to the cavity inner side 100 may also or alternatively be substantially uniform as the reservoir cavity 94 extends circumferentially about the axis 12. Of course, a corner between the cavity inner side 100 and the cavity circumferential side 104, 106 may be eased; e.g., radiused.

Referring to FIG. 4, the cavity height 110 may be non-uniform (e.g., varied) as the reservoir cavity 94 extends axially along the axis 12. The reservoir cavity 94 of FIG. 4, for example, includes a tapered forward region 114, a tapered aft region 116 and an intermediate region 118 axially between the forward region 114 and the aft region 116. As the forward region 114 extends axially (in a forward direction) along the axis 12 from the intermediate region 118 to the cavity forward end 96, the cavity height 110 may (e.g., continuously or incrementally) decrease. The inner side radius 112 may also or alternatively (e.g., continuously or incrementally) increase as the forward region 114 extends axially (in the forward direction) along the axis 12 from the intermediate region 118 to the cavity forward end 96. Similarly, as the aft region 116 extends axially (in an aft direction) along the axis 12 from the intermediate region 118 to the cavity aft end 98, the cavity height 110 may (e.g., continuously or incrementally) decrease. The inner side radius 112 may also or alternatively (e.g., continuously or incrementally) increase as the aft region 116 extends axially (in the aft direction) along the axis 12 from the intermediate region 118 to the cavity aft end 98. By contrast, the cavity height 110 and/or the inner side radius 112 may be substantially (or approximately) uniform as the intermediate region 118 extends axially between and to the forward region 114 and the aft region 116. This intermediate region 118 may thereby form a low region (e.g., a low spot, a drain area, a bilge, etc.) of the reservoir cavity 94 along the cavity inner side 100. With the foregoing arrangement, the cavity inner side 100 may have a (e.g., curved, arcuate, etc.) concave sectional geometry when viewed, for example, in a reference plane parallel with (e.g., including) the axis 12. An apex 120 of this concave sectional geometry is disposed in the intermediate region 118.

Referring to FIGS. 3 and 4, the feed passages 92 may be arranged into one or more sets. Each passage set includes one or more of the feed passages 92, and each set is associated with a respective vane 58A. In the specific embodiment of FIG. 3, the two vanes 58A are each associated with a respective passage set. However, in other embodiments, a single vane may be associated with all of the feed passages 92. In still other embodiments, more than two vanes may be associated with feed passages 92.

Referring to FIG. 4, each feed passage 92 extends longitudinally along a longitudinal centerline 122 of that respective feed passage 92 from an inlet 124 into the respective feed passage 92 to an outlet 126 from the respective feed passage 92. The passage inlet 124 is disposed/formed in the cavity inner side 100 along the intermediate region 118; e.g., at or about the apex 120. This passage inlet 124 fluidly couples the respective feed passage 92 to the reservoir cavity 94. The passage outlet 126 is disposed/formed in the inner case inner side 68. With this arrangement, each feed passage 92 may extend radially inwards from the reservoir cavity 94, through the respective vane 58A and the inner case 54, to the inner bore 52. Each passage outlet 126 may also be located at (or about) a respective axial end of a respective one of the bearings 36. Each feed passage 92 is thereby configured to direct fluid (e.g., lubricant, coolant, etc.) contained within the fluid reservoir 90 and its reservoir cavity 94 to or about the respective bearing 36, for example, for lubricating and/or cooling that bearing 36. Flow of the fluid through the inner case 54 may also cool the inner case 54 and, thus, the electric machine 88 between the bearings 36.

Each feed passage 92 may have a bent configuration. Each feed passage 92 of FIG. 4, for example, includes an outer segment 128, an inner segment 130 and an intermediate segment 132 (e.g., a bend, a transition, etc.). The outer segment 128 extends longitudinally along the respective passage centerline 122 from the respective passage inlet 124 to the respective intermediate segment 132. The passage centerline 122 along this outer segment 128 may be straight. The inner segment 130 extends longitudinally along the respective passage centerline 122 from the respective intermediate segment 132 to the respective passage outlet 126. The passage centerline 122 along this inner segment 130 may be straight. The intermediate segment 132 extends longitudinally along the respective passage centerline 122 from the respective outer segment 128 to the respective inner segment 130. The passage centerline 122 along this intermediate segment 132 may be non-straight; e.g., curved (e.g., arcuate) or otherwise bent. With this arrangement, each outer segment 128 may be angularly offset from the respective inner segment 130 by an included angle 134; e.g., an obtuse angle. The feed passages 92 may thereby fan out axially along the axis 12 to direct the fluid to various different locations. Here, the inner segments 130 of the forward feed passages 92A and 92B fan out in the forward direction along the axis 12, while the inner segments 130 of the aft feed passages 92C and 92D fan out in the aft direction along the axis 12.

Each feed passage 92 in a respective passage set may be provided with a unique configuration. Some or all of the outer segments 128, for example, may be provided with different longitudinal lengths. Some or all of the inner segments 130 may also or alternatively be provided with different longitudinal lengths. Some or all of the intermediate segments 132 may also or alternatively be provided with different longitudinal lengths and/or curvatures. Some or all of the feed passages 92 may also or alternatively be provided with different included angles 134 between the outer and the inner segments 128 and 130. It is contemplated, however, some or all of the feed passages 92 in a respective feed passage set may alternatively be provided with a common configuration, although perhaps oriented in a different (e.g., forward or aft) direction.

Figure 5:
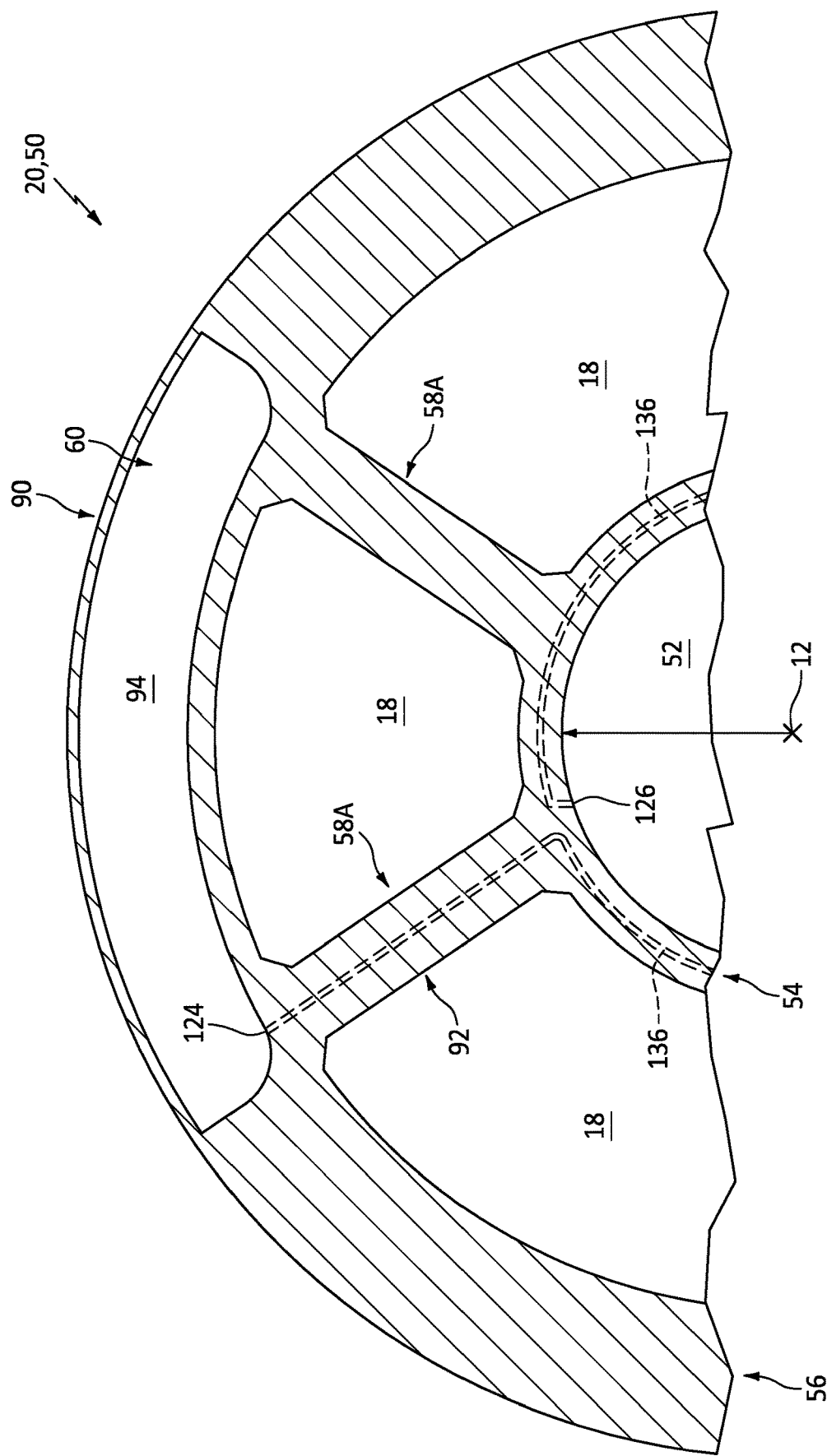
FIG. 5 is a partial cross-sectional illustration of the inlet structure with another feed passage configuration.

In some embodiments, referring to FIG. 4, some or all of the passage centerlines 122 associated with a respective vane 58A may lie in a common plane. A trajectory of each respective passage centerline 122, for example, may include a radial component and an axial component, but no lateral component. In other embodiments however, referring to FIG. 5, one or more of the feed passages 92 may include at least one segment 136 that extends circumferentially about the axis 12. The passage segment 136 of FIG. 5, for example, extends within the inner case 54 circumferentially about (e.g., partially or completely around) the axis 12 and the inner bore 52. With such an arrangement, fluid flowing through the feed passage 92 may cool the inner case 54 and, thus, the engine component(s) within the inner bore 52 at various locations circumferentially about the axis 12.

Referring to FIGS. 6A and 6B, the fluid reservoir 90 may be configured with a port 138 (e.g., a fluid fill port and/or a fluid drain port). In some embodiments, referring to FIG. 6A, the port 138 may project radially (in a radial inward direction towards the axis 12) into the inlet structure 50 and its outer case 56 to the reservoir cavity 94. In other embodiments, referring to FIG. 6B, the port 138 may extend laterally in the inlet structure 50 and its outer case 56 to the reservoir cavity 94. In both embodiments, the port 138 may be closed with a (e.g., removable) plug 140 for turbine engine operation.

The inlet structure 50 of FIGS. 2-6B is formed as (or part of) a monolithic body; e.g., a monolithic engine structure. Herein, the term "monolithic" may describe a component of the turbine engine which is formed as a single unitary body. The inlet structure 50 and its various members (e.g., 54, 56 and 58), for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another. Forming the inlet structure 50 as the monolithic body reduces part count and simplifies turbine engine assembly, disassembly and/or inspection. Moreover, forming the inlet structure 50 using additive manufacturing (e.g., building up the inlet structure 50 layer-by-layer) may facilitate integration of the fluid reservoir 90 as well as facilitate provision of the curved intermediate segments 132 of the feed passages 92 (e.g., see FIG. 4). The present disclosure, however, is not limited to the foregoing exemplary manufacturing techniques.

The turbine engine 10 is described above as a single spool, radial-flow gas turbine engine for ease of description. The present disclosure, however, is not limited to such an exemplary turbine engine. The turbine engine 10, for example, may alternatively be configured as an axial flow gas turbine engine. The turbine engine 10 may be configured as a direct drive gas turbine engine. The turbine engine 10 may alternatively include a geartrain that connects one or more rotors together such that the rotors rotate at different speeds. The turbine engine 10 may be configured with a single spool (e.g., see FIG. 1), two spools, or with more than two spools. In addition, while the turbine engine 10 is described above with an exemplary reverse flow annular combustor, the turbine engine 10 may also or alternatively include any other type/configuration of annular, tubular (e.g., CAN), axial flow and/or reverse flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
a monolithic engine structure including an inner case, an outer case, a plurality of vanes, a flowpath, a reservoir cavity and a plurality of feed passages;
the inner case extending axially along and circumferentially around an axis, and the inner case forming an inner boundary of the flowpath in the monolithic engine structure;
the outer case extending axially along and circumferentially around the inner case, and the outer case forming an outer boundary of the flowpath in the monolithic engine structure;
the plurality of vanes arranged circumferentially around the axis, each of the plurality of vanes extending radially across the flowpath from the inner case to the outer case, and the plurality of vanes comprising a first vane;
the reservoir cavity embedded within the outer case, the reservoir cavity extending circumferentially between opposing sides, the reservoir cavity extending radially within the outer case between an inner cavity side and an outer cavity side, and the inner cavity side including a concave sectional geometry extending axially within the reservoir cavity between a first end of the reservoir cavity and a second end of the reservoir cavity; and
the plurality of feed passages fluidly coupled with the reservoir cavity and extending through the first vane;
wherein a radius from the axis to the inner cavity side increases as the reservoir cavity extends axially in a first direction along the axis within the outer case from a low region of the inner cavity side to the first end of the reservoir cavity; and
wherein each of the plurality of feed passages includes an inlet disposed in the low region of the inner cavity side.

2. The apparatus of claim 1, wherein the radius further increases as the reservoir cavity extends axially in a second direction along the axis within the outer case from the low region of the inner cavity side to the second end of the reservoir cavity.

3. The apparatus of claim 1, wherein a first inlet into a first of the plurality of feed passages is disposed in the inner cavity side at an apex of the concave sectional geometry.

4. The apparatus of claim 1, wherein each of the plurality of feed passages extends from the reservoir cavity, radially through the first vane, to a respective outlet at an inner bore of the inner case.

5. The apparatus of claim 1, wherein
the plurality of feed passages comprises a first feed passage;
the first feed passage extends within the monolithic engine structure along a centerline from a first inlet into the first feed passage to an outlet from the first feed passage; and
the centerline is curved along an intermediate segment of the first feed passage.

6. The apparatus of claim 1, wherein
the plurality of feed passages comprises a first feed passage; and
a first segment of the first feed passage is angularly offset from a second segment of the first feed passage by a first included angle.

7. The apparatus of claim 6, wherein
the plurality of feed passages comprises a second feed passage; and
a first segment of the second feed passage is angularly offset from a second segment of the second feed passage by a second included angle that is different than the first included angle.

8. The apparatus of claim 1, wherein
the plurality of feed passages comprises a first feed passage and a second feed passage;
the first feed passage has a first centerline;
the second feed passage has a second centerline; and
the first centerline and the second centerline lie in a common plane.

9. The apparatus of claim 1, wherein
the plurality of feed passages comprise a first feed passage; and
a segment of the first feed passage extends circumferentially within the inner case about the axis.

10. The apparatus of claim 1, further comprising:
a first engine component housed within an inner bore of the monolithic engine structure;
the plurality of feed passages comprising a first feed passage; and
the first feed passage configured to direct a fluid contained within the reservoir cavity to the first engine component.

11. The apparatus of claim 10, wherein
the plurality of feed passages further comprise a second feed passage; and
the second feed passage is configured to further direct the fluid contained within the reservoir cavity to the first engine component.

12. The apparatus of claim 10, further comprising:
a second engine component housed within the inner bore of the monolithic engine structure;
the plurality of feed passages further comprising a second feed passage; and
the second feed passage configured to direct the fluid contained within the reservoir cavity to the second engine component.

13. The apparatus of claim 1, wherein
the plurality of vanes further comprise a second vane;
the plurality of feed passages are first-vane feed passages, and the monolithic engine structure further includes a plurality of second-vane feed passages; and
the plurality of second-vane feed passages are fluidly coupled with the reservoir cavity and extend through the second vane.

14. The apparatus of claim 1, wherein the monolithic engine structure is configured as an inlet structure adapted to direct air into the turbine engine.

15. An apparatus for a turbine engine, comprising:
an engine structure including an inner case, an outer case, a plurality of vanes, a flowpath, a reservoir cavity, a first feed passage and a second feed passage;
the inner case extending axially along and circumferentially around an axis, and the inner case forming an inner boundary of the flowpath in the engine structure;
the outer case extending axially along and circumferentially around the inner case, and the outer case forming an outer boundary of the flowpath in the engine structure;
the plurality of vanes arranged circumferentially around the axis, each of the plurality of vanes extending radially across the flowpath from the inner case to the outer case, and the plurality of vanes comprising a first vane;
the reservoir cavity extending radially within the outer case between an inner cavity side and an outer cavity side, the reservoir cavity extending axially along the axis between a forward end and an aft end, and the inner cavity side having a concave sectional geometry when viewed in a reference plane parallel with the axis;
the first feed passage extending, within the engine structure and through the first vane, between a first inlet into the first feed passage and an outlet from the first feed passage, and the first inlet into the first feed passage disposed in the inner cavity side about an apex of the concave sectional geometry; and
the second feed passage extending, within the engine structure and through the first vane, between a second inlet into the second feed passage and an outlet from the second feed passage, and the second inlet into the second feed passage disposed in the inner cavity side about the apex of the concave sectional geometry.

16. The apparatus of claim 15, wherein the engine structure is configured as a monolithic body.

17. The apparatus of claim 15, wherein the outlet from the first feed passage is disposed at an inner bore of the inner case.

18. An apparatus for a turbine engine, comprising:
an engine structure including an inner case, an outer case, a plurality of vanes, a flowpath, a reservoir cavity, a first feed passage and a second feed passage;
the inner case extending axially along and circumferentially around an axis, and the inner case forming an inner boundary of the flowpath in the engine structure;
the outer case extending axially along and circumferentially around the inner case, and the outer case forming an outer boundary of the flowpath in the engine structure;
the plurality of vanes arranged circumferentially around the axis, each of the plurality of vanes extending radially across the flowpath from the inner case to the outer case, and the plurality of vanes comprising a first vane;
the reservoir cavity embedded within the outer case, the reservoir cavity extending circumferentially between opposing sides, the reservoir cavity extending axial along the axis between a forward end and an aft end, the reservoir cavity extending radially within the outer case from a radial inner side to a radial outer side, and the radial inner side includes a first feed passage inlet and a second feed passage inlet;
the first feed passage fluidly coupled with the reservoir cavity at the first feed passage inlet, the first feed passage extending through the first vane into the inner case, a first segment of the first feed passage angularly offset from a second segment of the first feed passage by a first included angle; and
the second feed passage fluidly coupled with the reservoir cavity at the second feed passage inlet, the second feed passage extending through the first vane into the inner case, a first segment of the second feed passage angularly offset from a second segment of the second feed passage by a second included angle that is different than the first included angle.

19. The apparatus of claim 18, wherein the engine structure is configured as a monolithic inlet structure adapted to direct air into the turbine engine.

* * * * *